R. MATHEWS.
AUTOMATIC CAMERA SHUTTER OPERATING AND TIMING INSTRUMENT.
APPLICATION FILED DEC. 2, 1915.
1,230,501.
Patented June 19, 1917.
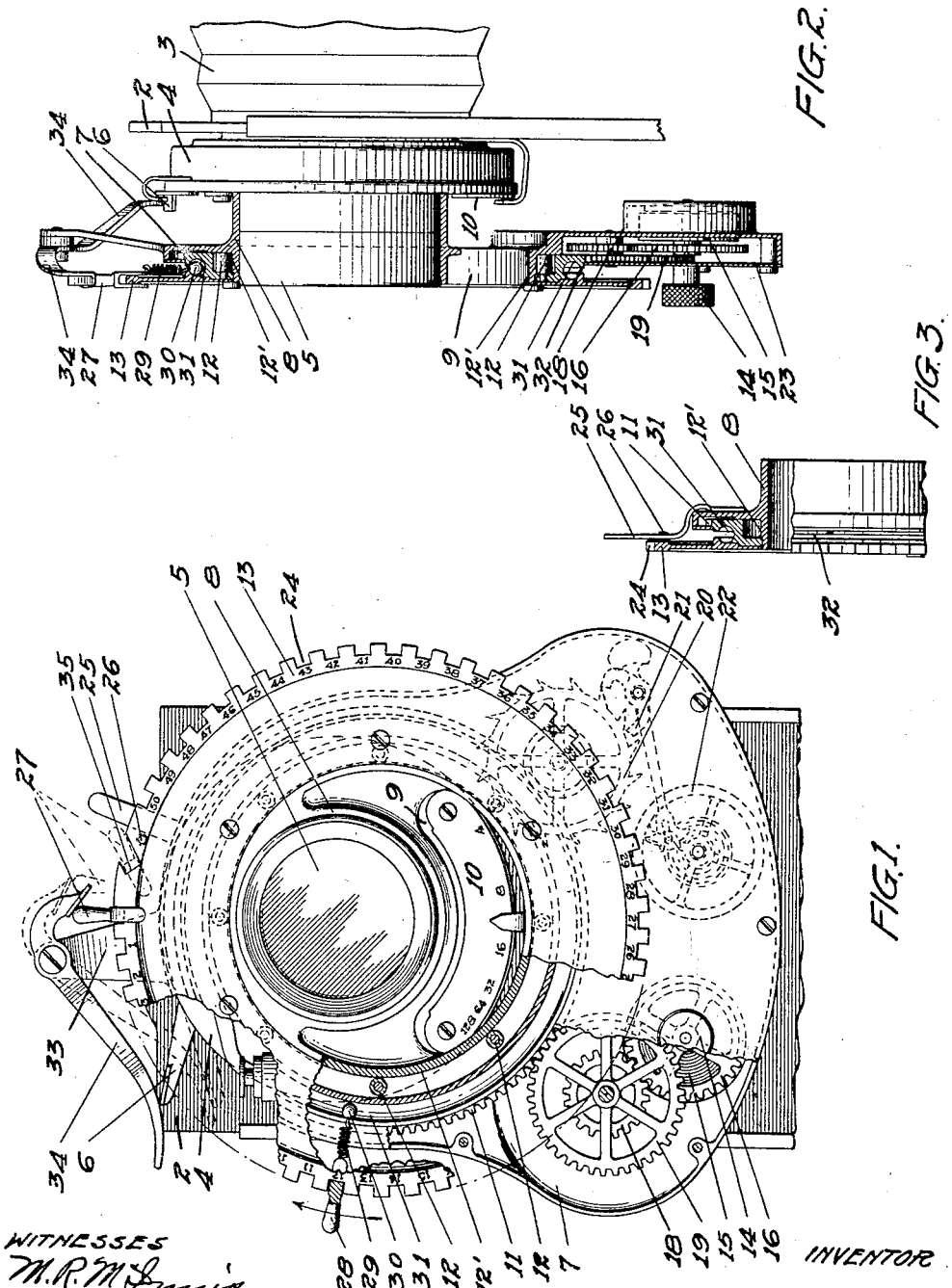
WITNESSES
INVENTOR
ROLLAND MATHEWS
BY Paul & Paul
ATTORNEYS

UNITED STATES PATENT OFFICE.

ROLLAND MATHEWS, OF MARSHALL, MINNESOTA.

AUTOMATIC CAMERA-SHUTTER OPERATING AND TIMING INSTRUMENT.

1,230,501.  Specification of Letters Patent.  Patented June 19, 1917.

Application filed December 2, 1915. Serial No. 64,701.

*To all whom it may concern:*

Be it known that I, ROLLAND MATHEWS, citizen of the United States, resident of Marshall, county of Lyon, State of Minnesota, have invented certain new and useful Improvements in Automatic Camera - Shutter Operating and Timing Instruments, of which the following is a specification.

My invention relates to improvements in the timing of the exposure of a photographic plate or film, and to the operation of the shutter of the camera or kodak, automatically, and the objects of my improvements are:

First, in the accurate timing of a "time exposure" without the necessity of action on the part of the operator in so doing, further than to set the mechanism, and pressing the release lever to start the same, and Second, in the automatic operation of the shutter in the taking of photographic pictures, after a desired number of seconds of time, giving the operator time in which to move within the field to be photographed, and thus appear in the picture produced, if he so desires, and, Third, in the taking of either time exposures or so-called "snap shots," according to the desire of the operator.

Other objects of the invention will appear from the following detailed description.

The invention consists generally in various constructions and combinations, all as hereinafter described and particularly pointed out in the claims.

In the accompanying drawings forming part of this specification,

Figure 1 is a front elevation of the attachment, with the dial partially broken away to illustrate the operating mechanism.

Fig. 2 is a vertical sectional view of the same, showing the application of the device to a camera, Fig. 3 is a detail sectional view, showing the relative arrangement of the revolving members of the attachment and the position of the stop device.

In the drawing, 2 represents the sliding front portion of a kodak or camera of ordinary construction, having bellows 3, a casing 4 for the shutter mechanism, a lens 5, and a shutter operating mechanism 6, all of any ordinary or preferred construction.

7 is a casing, having a collar 8 which fits snugly over the lens 5, as shown clearly in Fig. 2. This collar may be held in place by frictional engagement with the lens casing or may have some suitable clamping means, not shown. A curved slot 9 is provided in the casing to allow access to the scale 10, bearing the usual graduations indicating the size of the shutter opening. A gear 11 is provided with antifriction rollers 12 bearing against 12' in the casing 7 and upon said gear is mounted a suitable dial 13. The gear is held in place by means of a suitable cover 11' that is secured by screws to the casing. The dial and gear are free to rotate in the casing and the latter is driven by a suitable clock mechanism comprising a winding stem 14 having the usual connections with a spring 15 and a gear 16 meshing with a pinion 18 of a gear 19, which in turn meshes with the gear ring 11 on the dial 13. The gear 11 meshes with a pinion on an escapement wheel 20, provided with the usual lever and verge 21 and balance wheel 22, all of ordinary construction. This mechanism is all mounted in the casing 7 and concealed by a suitable cover plate 23.

The dial is provided with a series of peripheral teeth 24, each marked to represent seconds of time. A stop lever 25 is mounted to engage a pin 26 on the dial and prevent revolution thereof. The lever 25 is preferably secured at one end on the casing and composed of spring material, so that it can be bent outwardly to clear the stop pin when it is desired to release the attachment.

Pins 27 and 28 are mounted to enter the recesses between the teeth 24 and are held therein by springs 29 and a ball 30 having a suitable bearing in an annular groove 31 that is formed by the gear 11 and the dial 13. A slot 32 permits the pin to be moved around the disk to engage any one of the notches therein.

The casing 7 is provided at its upper end with an arm 33 on which a bell crank 34 is mounted. The short arm of this bell crank is positioned to be engaged by the pins 27 and 28 as the dial is revolved, while the long arm of the bell crank is mounted to contact with the shutter lever 6 and trip the same, as indicated by full and dotted lines in Fig. 1.

I prefer to provide a diagonal notch 35 in the periphery of the dial 13 into which one of the trip or trigger pins 27 or 28 may be inserted, and when placed in this slot, the trigger will pass beneath the lever 34 without contacting therewith. By this arrangement I am able to temporarily dispose of one of the pins to render it inactive when the device is to be used for taking snap-shots and only one trigger is required. This inactive position of the pin in the notch 35 I have indicated by dotted lines in Fig. 1.

From the foregoing description it will be noted that this camera attachment, mounted to encircle the lens and eccentric with respect thereto, may be and usually would be a permanent part of the camera, requiring practically no additional space in the camera case and not in any way obstructing or making inconvenient the usual use of the camera and the tripping of its shutter lever by a bulb or by the finger in the ordinary way. The stop 25 will prevent the dial from revolving and the operating spring 15 may be wound and power stored therein for setting the mechanism in motion as soon as the stop 25 is tripped to disengage it from the pin 26. At that time the dial will begin to revolve and make a complete revolution or until the pin 26 again contacts with the stop 25. During this time the shutter lever may be tripped at varying intervals, according to the position of the trigger pins on the periphery of the dial.

In Fig. 1 these pins are shown in position to trip the shutter lever for a twelve second exposure, that being the interval represented by the figures on the dial between the two points. If an instantaneous exposure is desired, the pin 27 may be inserted into the notch 35 and if the pin 28 is left in the position shown, the operator would have ample time to move into the field of the camera before the exposure took place and it is therefore possible for the user of the camera to appear in a snap-shot, the time before the exposure depending, of course, upon the position of the trigger pins on the dial and the number of seconds to elapse before it reaches a position to trip the camera shutter.

If the operator desires to appear in a time exposure picture, he will move one pin a sufficient distance from the point where it would trip the shutter to provide sufficient time for him to walk into the camera field, and then, by the adjustment of the other pin, provide a sufficient number of seconds' interval for the length of exposure desired. In this way the user of the camera can take a snap-shot or time exposure and appear in the picture himself if he desires, and without removing the attachment can use the camera with an ordinary bulb or finger trip for the lens shutter.

In various ways the details of construction herein shown and described may be modified and still be within the scope of my invention.

I claim as my invention:

1. A camera attachment comprising a revolving disk, means for operating the same, said disk having a series of peripheral notches, a trip device mounted to slide on the periphery of said disk and fit the said notches and yieldingly held therein, said device being positioned to trip the camera shutter at a predetermined point in the revolution of said disk.

2. A camera attachment comprising a disk, means for revolving the same, said disk having an annular way on one side thereof, a weighted member slidable in said way, a trip device mounted to slide on the periphery of said disk and having a yielding connection with said weighted member, said trip device being mounted to engage and trip the camera shutter at a predetermined point in the movement of said disk.

3. A camera attachment comprising a revolving member having peripheral notches therein and graduated to represent intervals of time, mechanism for revolving said member, trip devices adjustably mounted on the periphery of said member in position to trip the camera shutter, one of the notches in said member allowing the trip device to be inserted in an inactive position therein, for the purpose specified.

4. A camera attachment comprising a revolving member having means for mounting it on a camera, the periphery of said member being scored to represent intervals of time, trip devices mounted on said member for operating the camera shutter, said member having means whereby one of said trip devices may be rendered temporarily inactive, for the purpose specified.

In witness whereof, I have hereunto set my hand this 29th day of November 1915.

ROLLAND MATHEWS.

Witnesses:
AMBROSE RUANE,
M. E. MATHEWS.